(12) United States Patent
Hayama et al.

(10) Patent No.: US 8,054,387 B2
(45) Date of Patent: Nov. 8, 2011

(54) ELECTRONIC APPARATUS AND PROJECTOR

(75) Inventors: Hitoshi Hayama, Shiojiri (JP); Shuichi Fujiwara, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 1296 days.

(21) Appl. No.: 11/677,374

(22) Filed: Feb. 21, 2007

(65) Prior Publication Data
US 2007/0207766 A1 Sep. 6, 2007

(30) Foreign Application Priority Data

Mar. 6, 2006 (JP) .................................. 2006-059061
Jul. 4, 2006 (JP) .................................. 2006-184677

(51) Int. Cl.
*H04N 5/44* (2006.01)
(52) U.S. Cl. .................. 348/734; 340/12.28; 340/12.52; 340/12.29
(58) Field of Classification Search .................. 348/734, 348/552; 340/12.22–12.29, 12.3, 12.5, 12.52
See application file for complete search history.

(56) References Cited

U.S. PATENT DOCUMENTS 6,750,782 B1 * 6/2004 Byun ......................... 340/12.28
7,173,541 B2 * 2/2007 Park et al. ................... 340/12.24

FOREIGN PATENT DOCUMENTS

| JP | A-2-260797 | 10/1990 |
| JP | A 2001-245371 | 9/2001 |
| JP | A-2005-6058 | 1/2005 |

* cited by examiner

*Primary Examiner* — Michael Lee
(74) *Attorney, Agent, or Firm* — Oliff & Berridge, PLC

(57) ABSTRACT

An electronic apparatus includes a remote control device that transmits a predetermined key code signal, excluding a unique key code (signal) for identifying the device itself, and an operation information signal of a user, a receiving unit that receives the signals to be transmitted by the remote control device, an arithmetic unit, and an ID number setting unit that sets an ID number peculiar to a main body. The arithmetic unit receives the operation information signal when information specified by a set of the key code received by the receiving unit and numerals is consistent with information specified by the ID number set by the ID number setting unit.

7 Claims, 18 Drawing Sheets

⟨ EXAMPLE OF CONFIGURATION OF ID ENABLING
SETTING TABLE 119 AND DATA ⟩

| MENU NUMBER | NEW MENU NUMBER | MENU NAME | ENABLE/DISABLE |
|---|---|---|---|
| 1 | | DISPLAY POSITION | |
| 2 | 1 | HORIZONTAL POSITION | ENABLE |
| 3 | 1 | VERTICAL POSITION | ENABLE |
| 4 | 1 | KEYSTONE CORRECTION | DISABLE |
| 5 | | BRIGHTNESS/COLOR | |
| 6 | 5 | BRIGHTNESS | DISABLE |
| 7 | 5 | CONTRAST | DISABLE |
| 8 | 5 | COLOR ADJUSTMENT | DISABLE |
| 9 | 5 | COLOR MODE | ENABLE |

ELECTRONIC APPARATUS AND PROJECTOR

BACKGROUND

1. Technical Field

The present invention relates to an electronic apparatus that operates by a remote control device, and a projector.

2. Related Art

As a technology about a remote control device transmitting an ID code, there is known a remote control device described in JP-A-2001-245371. In the remote control device, when a communication start key of a remote control device is depressed, the remote control device transmits an ID code transmission request signal to all apparatuses within a remote control signal transmission range. Then, the remote control device receives all ID codes returned by apparatuses receiving the ID code transmission request signal and selects an arbitrary apparatus among the apparatuses to set its display and operation keys required for the operation of the apparatus so as to operate the apparatus.

When a plurality of electronic apparatuses operate by the remote control device, the remote control device has a function of transmitting the ID code and controls a reception-side electronic apparatus to response an operation signal of the remote control device only when the corresponding ID code is consistent with an ID code set by the reception-side electronic apparatus.

However, the remote control device having an ID code transmission function is expensive compared with a general remote control device.

SUMMARY

An advantage of some aspects of the invention is that it obtains an electronic apparatus in which a general remote control device not having an ID code transmission function can exhibit the same effects as a remote control device having an ID code transmission function.

According to an aspect of the invention, an electronic apparatus includes a remote control device that transmits a predetermined key code signal, excluding a unique key code (signal) for identifying the device itself, and an operation information signal of a user, a receiving unit that receives the signals to be transmitted by the remote control device, an arithmetic unit; and an ID number setting unit that sets an ID number peculiar to a main body. The arithmetic unit receives the operation information signal when information specified by a set of the key code received by the receiving unfit and numerals is consistent with information specified by the ID number set by the ID number setting unit. Accordingly, even though the operation is performed by a general remote control device not having an ID code transmission function, the same effects as a remote control device having an ID code transmission function can be obtained. Moreover, the term 'unique key code signal' represents an identification code peculiar to the remote control device, such as a signal to be transmitted by an ID key of a remote control device having an ID transmission function. That is, in the invention, the remote control device refers to a remote control device not having a unique identification code transmission function, such as the ID transmission function.

In the electronic apparatus according to the aspect of the invention, even though when the information specified by the set of the key code received by the receiving unit and the numerals is not consistent with the information specified by the ID number set by the ID number setting unit, when a predetermined ID number is specified in the main body, the arithmetic unit may receive the operation information signal. Accordingly, after the ID number of the electronic apparatus main body is set, since a user can release the ID number of the electronic apparatus main body when a batch operation is not performed regardless of the setting of the ID number, which relieves the user of the border of the operation. Therefore, convenience can be improved.

In the electronic apparatus according to the aspect of the invention, in a case where the ID number is set by the ID number setting unit, when the receiving unit receives the set of the key code and a predetermined numeral from the remote control device, the arithmetic unit may release setting of the ID number set by the ID number setting unit. Accordingly, the user can be relieved of the border of the setting release operation of the ID number of the main body for every apparatus. Therefore, convenience can be improved.

The electronic apparatus according to the aspect of the invention may further include an ID enabling menu setting unit that, in a predetermined menu item, sets whether or not the ID number set by the ID number setting unit is enabled. Even though when the information specified by the set of the key code received by the receiving unit and the numerals is not consistent with the information specified by the ID number set by the ID number setting unit, for a menu item set purporting that the ID number is disabled, the arithmetic unit may execute a function of the corresponding menu item. Accordingly, a setting parameter common to the apparatuses can be commonly set through a batch operation by the remote control device, and the ID number relative to a specific setting parameter to be separately set can be assigned and set for each apparatus. Therefore, convenience of the user can be improved under an environment where parameters of the plurality of apparatuses need to be set.

The electronic apparatus according to the aspect of the invention may further include an ID key setting unit that sets information for specifying the key code. The arithmetic unit may regard a signal specified by the ID key setting unit as the key code. Accordingly, the user can set an arbitrary key as an alternative key for the ID key. Therefore, a range of choices of the remote control device can be increased.

In the electronic apparatus according to the aspect of the invention, an ID flag may be provided. Further, the arithmetic unit may perform resetting or setting the ID flag hereinafter, referred to as first processing) when the information specified by the set of the key code received by the receiving unit and the numerals is consistent with information specified by the ID number set by the ID number setting unit or a predetermined ID number, may perform, on the ID flag, a second processing opposite to the first processing in other cases, and may receive the operation information signal if the ID flag is subjected to the first processing. An operation signal from the remote control device is received according to the state of the ID flag (IDF). For example, when a predetermined ID number ('0' in an embodiment described below) is transmitted from the remote control signal, a plurality of electronic apparatuses that are disposed in the vicinity of the remote control device can be collectively controlled. Further, when the ID number peculiar to the main body is transmitted, a corresponding electronic apparatus is to be controlled from that time. For this reason, operationality by the remote control device can be markedly improved.

In the electronic apparatus according to the aspect of the invention, the arithmetic unit may perform the first processing on the ID flag at the beginning of power activation. Accordingly, a plurality of electronic apparatus can be unconditionally and collectively controlled by transmitting an operation signal at the beginning of the power activation (until the ID number (excluding a predetermined ID number) is transmitted from the remote control device). Therefore, operationality by the remote control device can be markedly improved.

According to another aspect of the invention, a projector includes the above-described electronic apparatus. Accordingly, it is possible to obtain a projector in which, even though the operation is performed by a general remote control device not having an ID code transmission function, the same effects as a remote control device having an ID code transmission function can be obtained. Further, it is possible to obtain a projector that can enable an ID number for each menu. In addition, it is possible to obtain a projector that can set an arbitrary key as an alternative key for an ID key.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
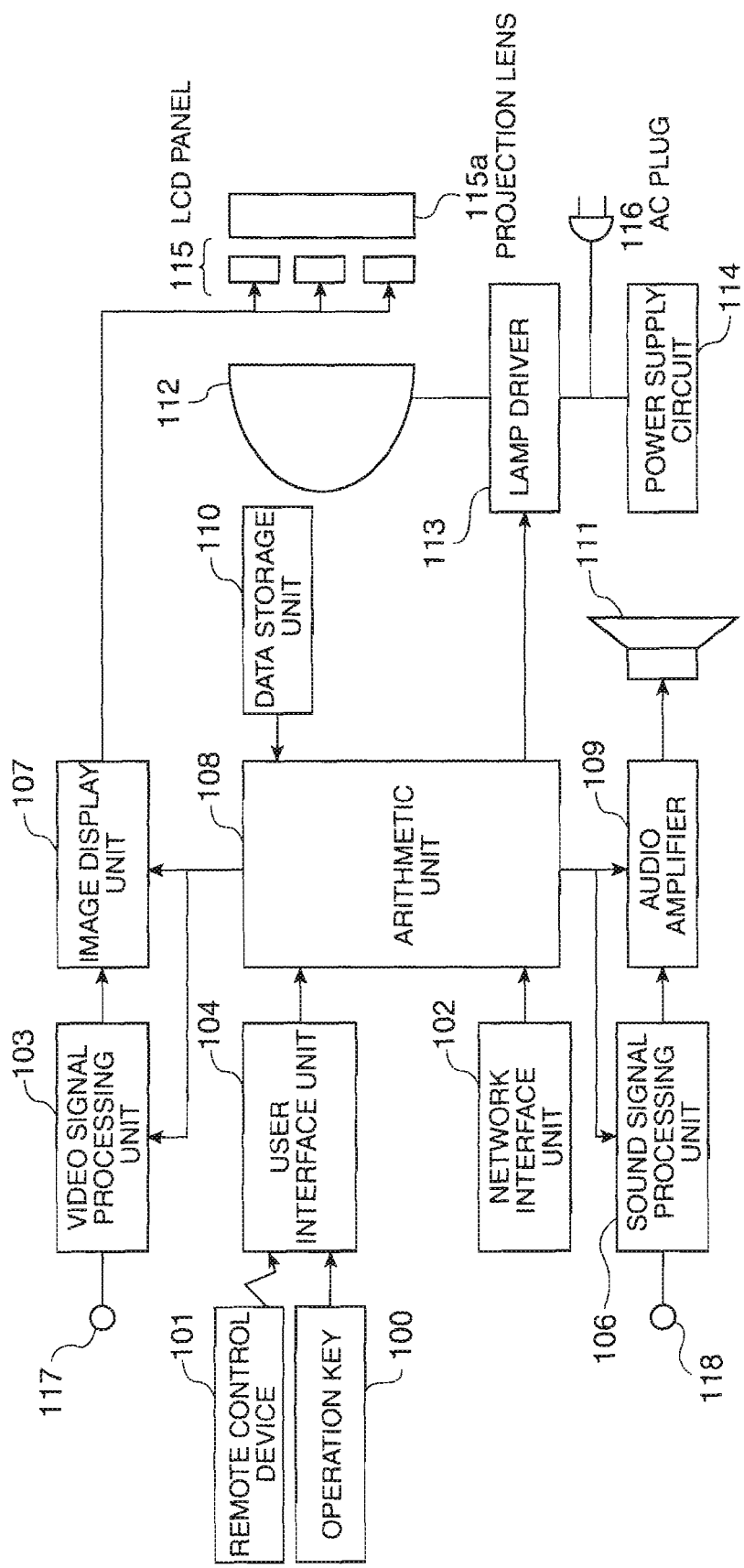
FIG. 1 is a functional block diagram of a projector according to a first embodiment of the invention.

FIG. 1 is a functional block diagram of a projector as an example of an electronic apparatus according to a first embodiment of the invention.

A projector shown in FIG. 1 includes an operation key 100, a remote control device 101, a network interface unit 102, a video signal processing unit 103, a user interface unit 104 (receiving unit), a sound signal processing unit 106, an image display unit 107, an arithmetic unit 108, an audio amplifier 109, a data storage unit 110, a speaker 111, a lamp 112, a lamp driver 113, a power supply circuit 114, an LCD panel 115, a projection lens 115a, an AC plug 116, an image signal input unit 117, and a sound signal input unit 118.

Moreover, in FIG. 1, only the circuit configuration required for illustrating the projector according to the first embodiment is shown, and other circuit configurations are omitted.

The operation key 100 and the remote control device 101 are used by a user for the operation of the projector. The network interface unit 102 is a LAN interface and receives a LAN packet. The video signal processing unit 103 receives an instruction of the arithmetic unit 108 or a video signal from the video signal input unit 117 and performs a predetermined video processing on the video signal so as to generate a video signal suitable for display.

The user interface unit 104 receives an operation information signal from the remote control device 101 or an operation signal of the operation key 100 and sends the received signal to the arithmetic unit 108. The sound signal processing unit 106 receives an instruction of the arithmetic unit 108 or a sound signal from the sound signal input unit 118 and performs a processing on the sound signal. The image display unit 107 performs an image output using the LCD panel 115 and the projection lens 115a on the basis of the processing result of the video signal processing unit 103 or an instruction of the arithmetic unit 108.

The audio amplifier 109 performs a sound output using the speaker 111 on the basis of the processing result of the sound signal processing unit 106 or an instruction of the arithmetic unit 108. The data storage unit 110 stores an ID number of a projector main body, a setting menu item, and the like.

The lamp 112 is a light source. The lamp driver 113 controls the lamp 112 on the basis of an instruction of the arithmetic unit 108.

The power supply circuit 114 performs a processing, such as power adjustment or the like. The AC plug 116 supplies power to the projector according to the first embodiment.

In the projector according to the first embodiment, a user performs a setting operation of the ID number of the projector main body by operating the remote control device, and the arithmetic unit 108 stores the operation content in the data storage unit 110 (with this configuration, a function corresponding to an ID number setting unit is implemented).

Figure 2:
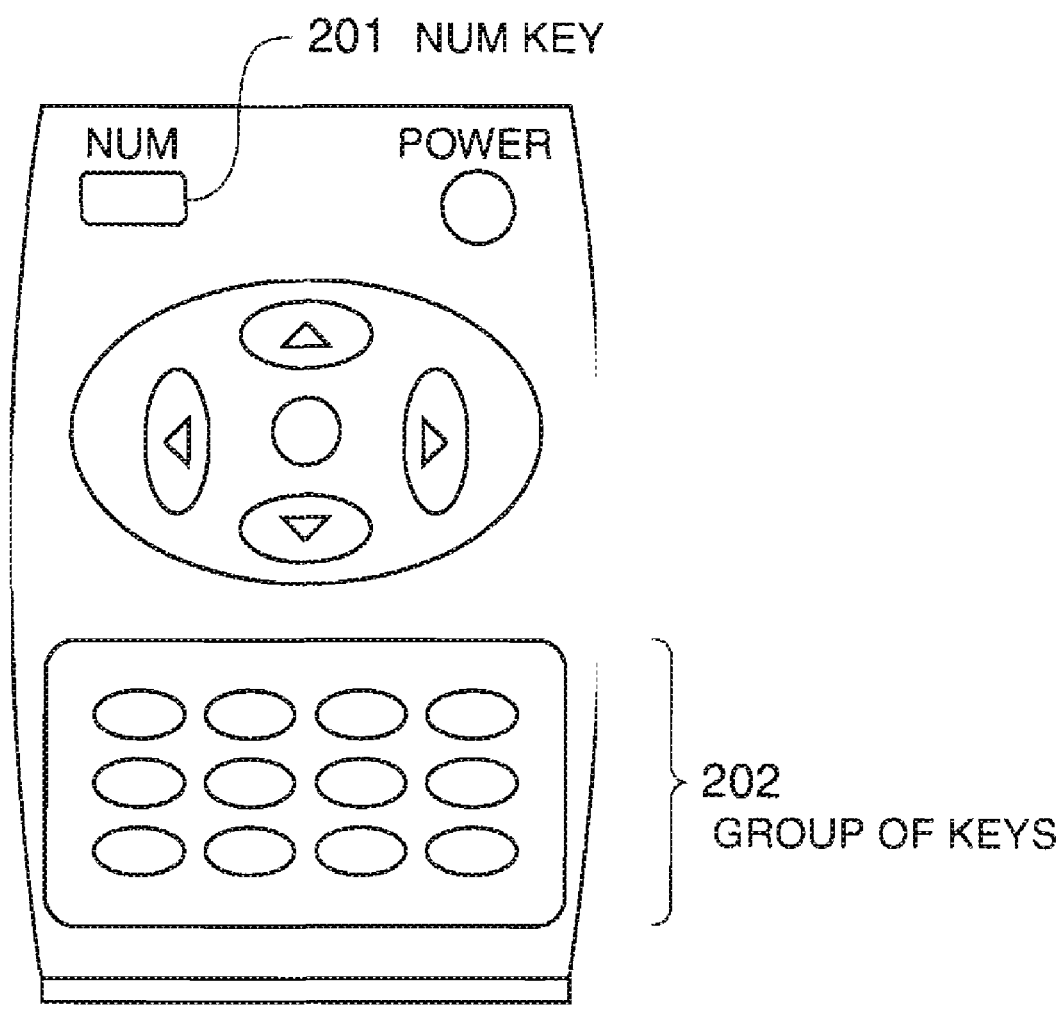
FIG. 2 is a diagram showing keys and the like of a remote control device 101 shown in FIG. 1.

FIG. 2 is a diagram showing keys and the like of the remote control device 101 shown in FIG. 1. The remote control device 101 is a general remote control device not having an ID code transmission function. Hereinafter, the respective keys will be described. 'NUM key' is a key that is depressed in advance to clarify an input of a numeral when a numeral is input on a setting screen.

For example, when there is a numeric key to be used for channel number assignment, if only the numeric key is depressed to input a numeral, a channel number assignment signal may be transmitted from the remote control device 101 and the setting screen may be changed to a screen of the corresponding channel, which makes it impossible to continue setting. In this case, a subsequent input of a numeric key is processed as a numeral input, not channel number assignment, by depressing 'NUM key' in advance, and the setting screen is not changed to the channel screen. Then, setting can be continued.

In 'group of keys', a group of numeric keys to be used for channel number assignment or the like, a volume assignment key, and the like are provided.

Figure 3:
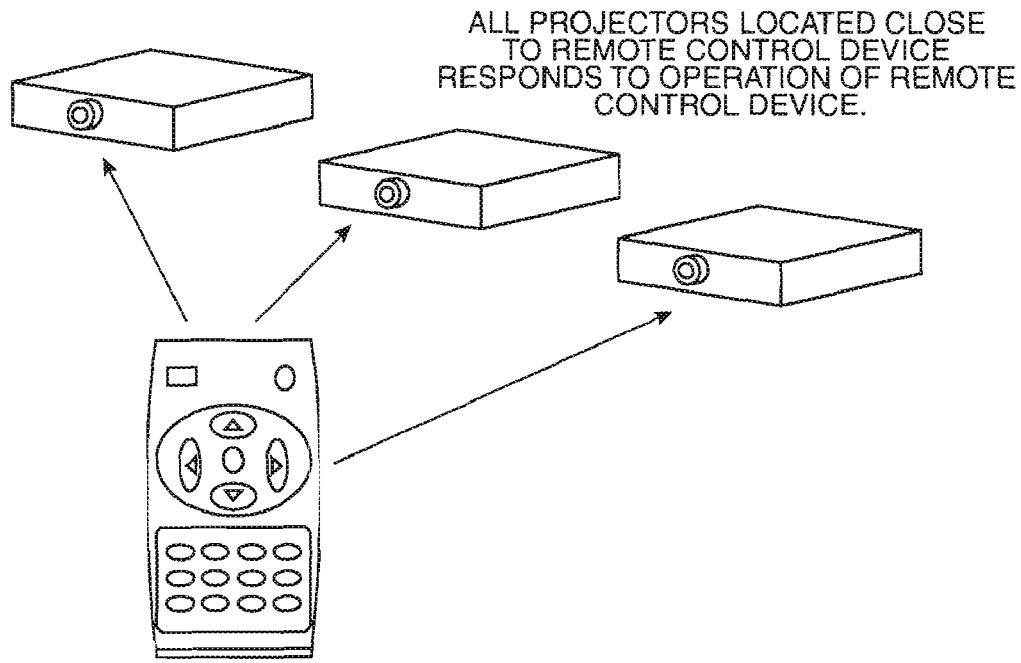
FIG. 3 is a diagram illustrating an example of the use of a remote control device not having an ID transmission function.

FIG. 3 is a diagram illustrating a case where an inconsistency occurs when a general remote control device not having an ID transmission function is used. In FIG. 3, projectors are illustrated as an example.

Under an environment where a plurality of electronic apparatuses, such as a display near the entrance of the store and the like, corresponding to the remote control device are disposed near, an operation signal transmitted by the remote control device reaches a plurality of electronic apparatuses. Since the content of the operation signal is the same in the electronic apparatuses of the same kind, electronic apparatuses other than an electronic apparatus to be intended to operate by the remote control device may respond to the operation of the remote control device. Then, users of other electronic apparatuses encounter inconvenience.

Figure 4:
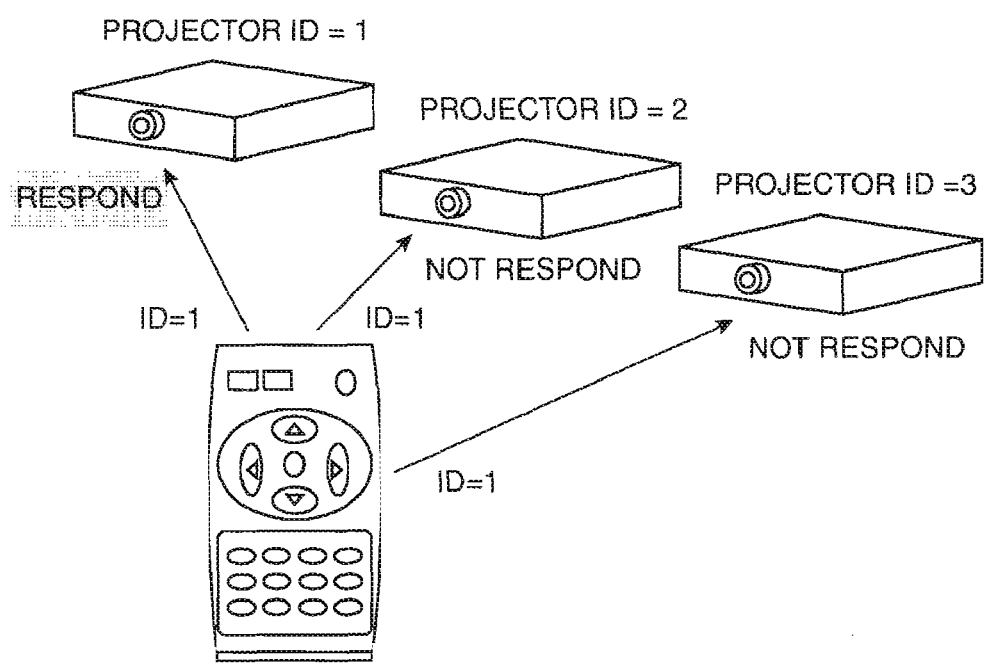
FIG. 4 is a diagram illustrating an example of the use of a remote control device having an ID transmission function.

FIG. 4 is a diagram illustrating a method of preventing the inconvenience described with reference to FIG. 3 when a remote control device having an ID transmission function is used.

The remote control device having an ID transmission function can transmit an identification ID of the device itself when transmitting an operation signal. For this reason, if an ID number corresponding to the identification ID of the remote control device is set in a reception-side electronic apparatus, the electronic apparatus can receive the signal from the remote control signal only when both ID are consistent with each other. Accordingly, it is possible to prevent the inconsistency that all apparatuses respond to the operation of the remote control device, as shown in FIG. 3.

However, the remote control device having an ID transmission function is expensive compared with the general remote control device not having an ID transmission function. This embodiment of the invention is to obtain an electronic apparatus in which the remote control device not having an ID transmission function can have the same effects as the remote control device having an ID transmission function.

The general remote control device not having an ID transmission function does not have a key to be used for ID transmission, but may have a special key, such as 'NUM key', as shown in FIG. 2. In the projector according to the first embodiment, the same effect as the ID transmission is obtained through a combination of such a special key (corresponding to 'predetermined key code' of the invention) and numeric keys.

Figure 5:
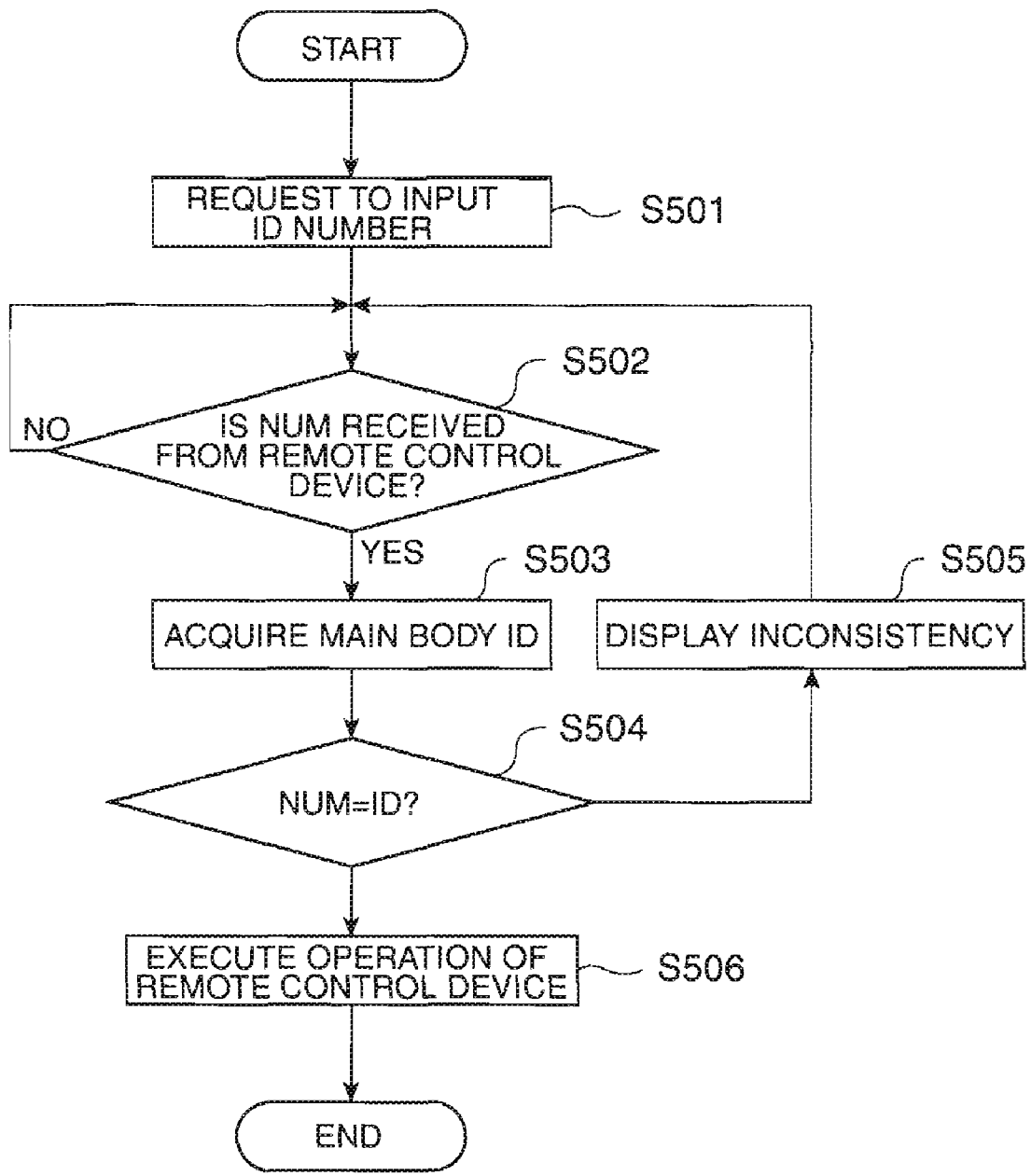
FIG. 5 is a diagram illustrating an operation when the remote control device 101 transmits an operation information signal.

FIG. 5 is a diagram illustrating an operation when the remote control device 101 transmits an operation information signal in the projector of FIG. 1.

(Step S501) If the remote control device 101 transmits the operation information signal, the user interface unit 104 receives the operation information signal and sends the operation information signal to the arithmetic unit 108.

The arithmetic unit 108 requests to input an ID number or sends the purport to the image display unit 107 so as to instruct the image display unit 107 to output a screen and demands the user to input the ID number, if necessary.

(Step S502) The arithmetic unit 108 waits until the ID number is input from the remote control device 101. Here, it is assumed that the input of 'NUM key' and 'Numeric key' is regarded as the input of the ID number. (Step S503) The arithmetic unit 108 acquires the ID number of the projector main body from the data storage unit 110. It is assumed that the ID number of the projector main body is prescribed in advance, and the details will be described with reference to FIG. 6.

(Step S504) The arithmetic unit 108 compares the ID number ('NUM key' and 'Numeric key') transmitted by the remote control device 101 and the ID number of the projector main body. If both are the same, the process progresses to Step S506. If both are not the same, the process progresses to Step S505.

(Step S505) The arithmetic unit 108 sends, to the image display unit 107, a purport that the ID number ('NUM key' and 'Numeric key') transmitted by the remote control device 101 and the ID number of the projector main body are inconsistent with each other, and instructs the image display unit 107 to output a screen.

(Step S506) The arithmetic unit 108 executes a processing corresponding to the operation information signal transmitted by the remote control device 101.

Figure 6:
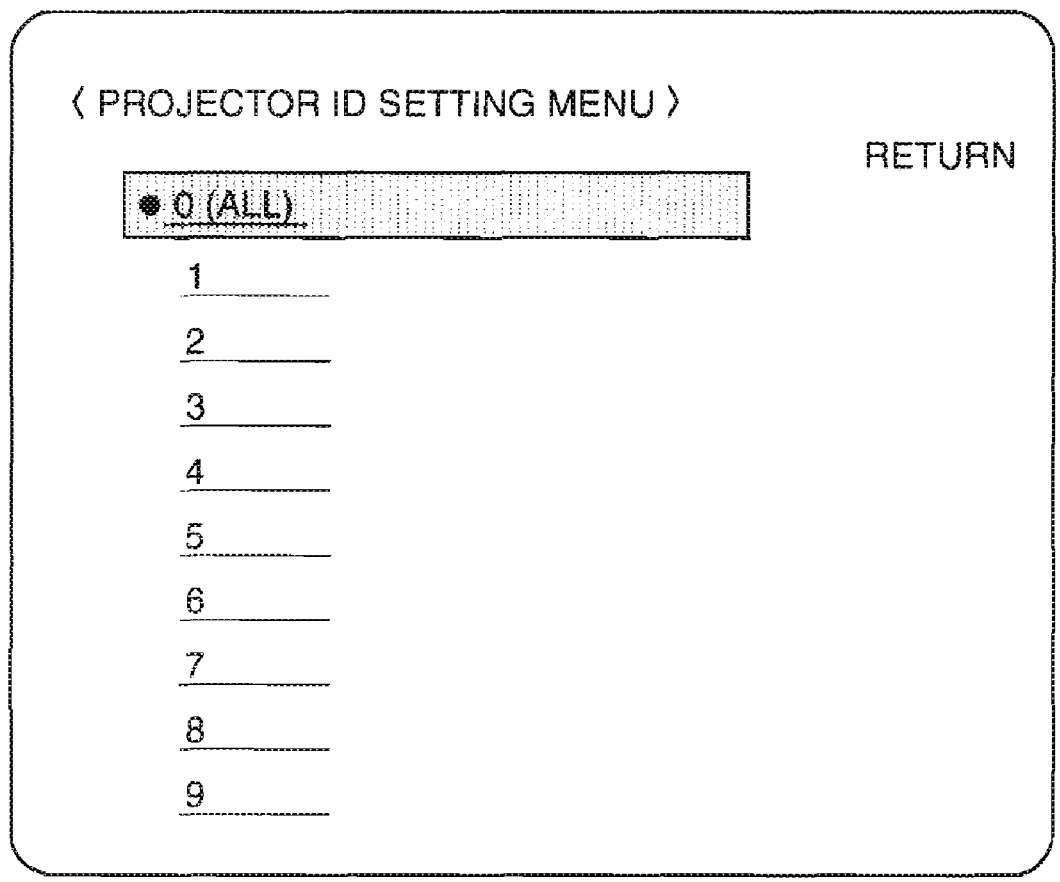
FIG. 6 is a diagram showing a setting screen for setting an ID number of a projector main body.

FIG. 6 is a diagram showing an image of a setting screen for setting the ID number of the projector main body.

A projector user can set the ID number of the projector main body on a screen shown in FIG. 6 by operating the operation key 100 or the remote control device 101. The arithmetic unit 108 stores the set ID number in the data storage unit 110.

As the ID number, ten values of '0' to '9' can be set.

The operation when '0' is set will be described with reference to FIG. 8.

Figure 7:
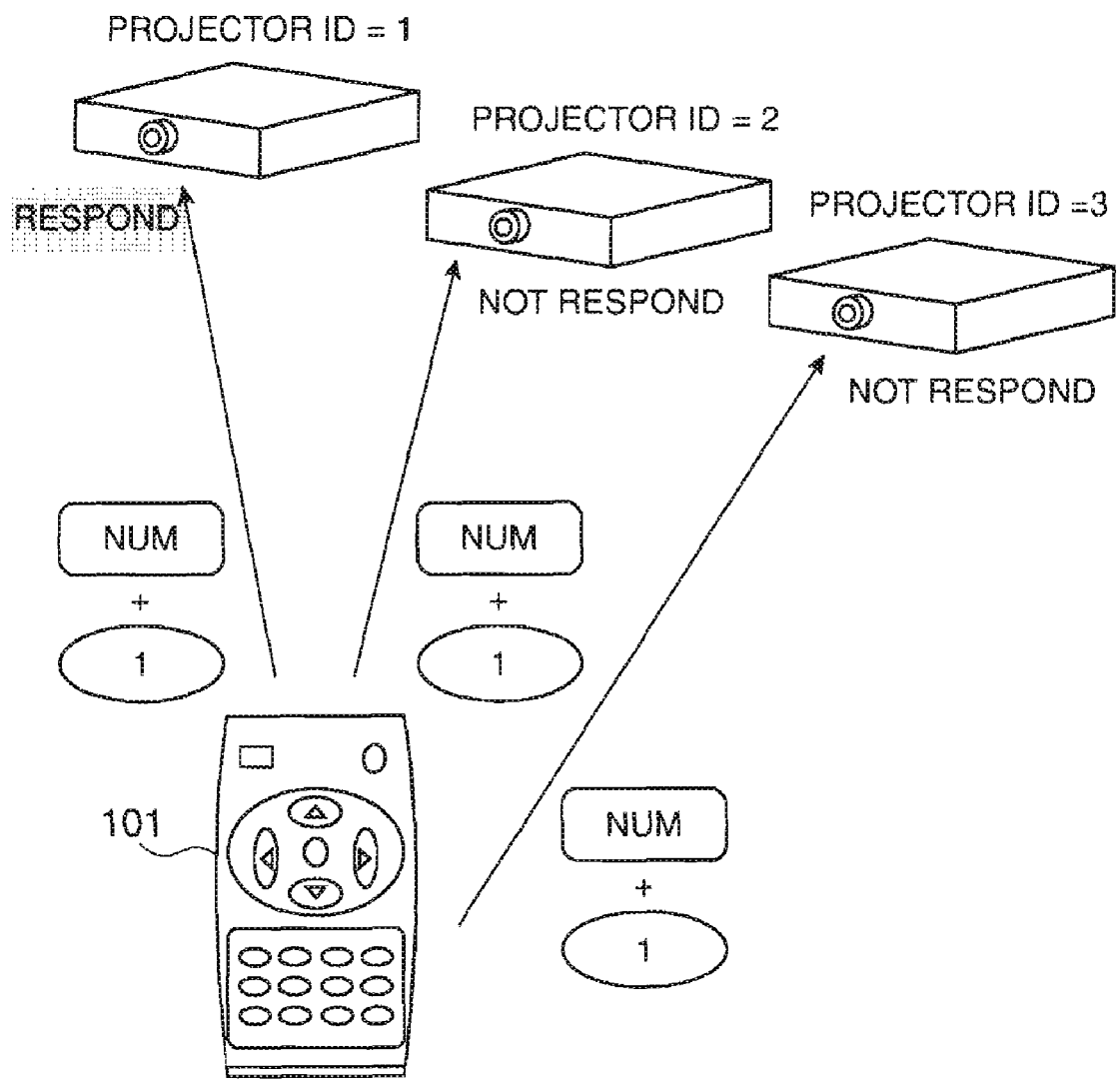
FIG. 7 is a diagram illustrating an operation after the ID number of the projector main body is set.

FIG. 7 is a diagram illustrating an operation after the ID number of the projector main body is set.

As shown in FIG. 7, only when the ID number of the projector main body and the value of 'NUM key' and 'Numeric key' to be transmitted by the remote control device 101 are consistent with each other, the projector responds to the operation of the remote control device. Accordingly, even though the remote control device 101 does not have an ID transmission function, the same effects as the remote control device having an ID transmission function can be obtained.

Figure 8:
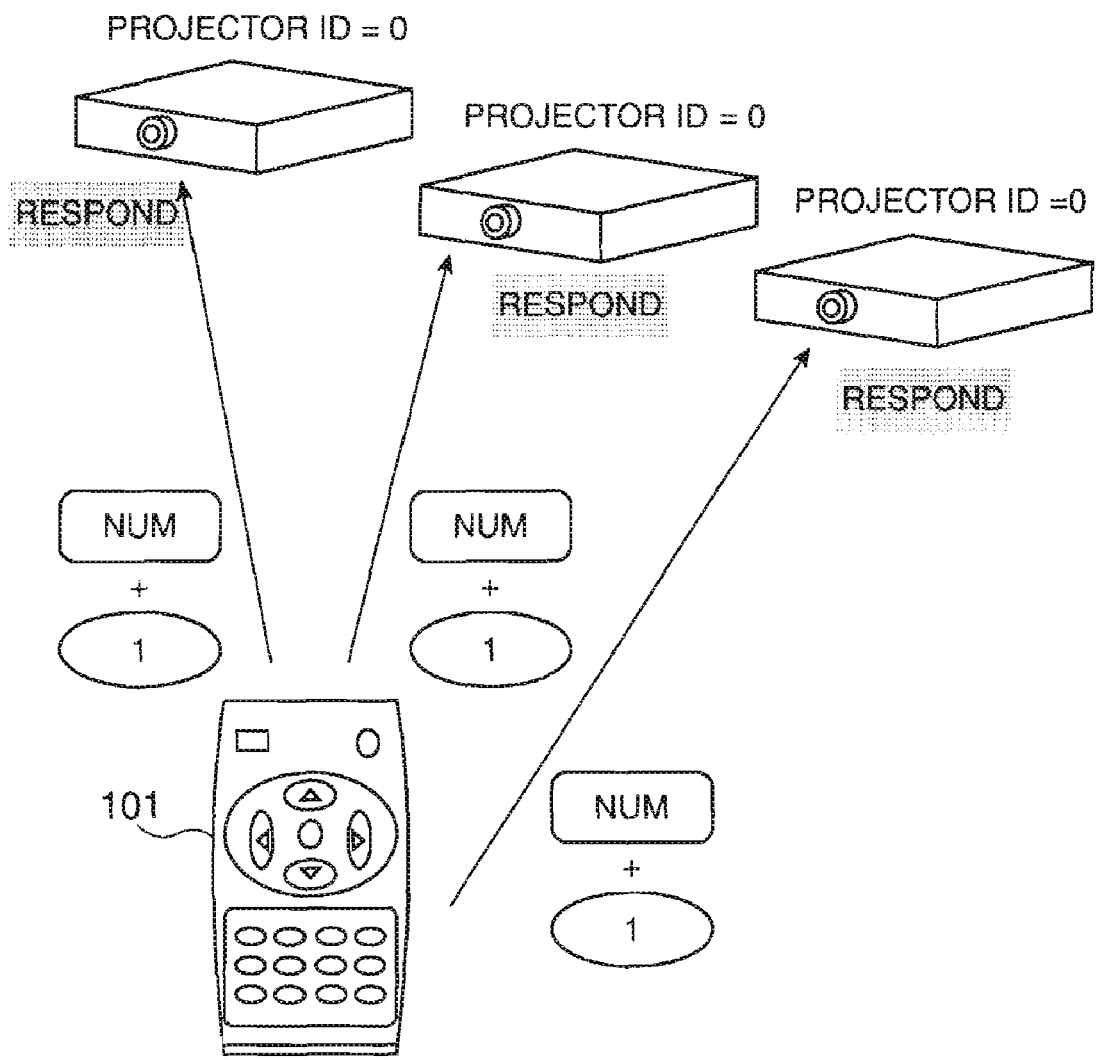
FIG. 8 is a diagram illustrating an example of an operation when the ID number of the projector main body is set to '0'.

FIG. 8 is a diagram snowing an example of an operation when the ID number of the projector main body is set to '0'.

As shown in FIG. 8, when the ID number of the projector main body is set to '0', the projector may be configured to respond to the operation information signal to be transmitted by the remote control device 101, regardless of 'NUM key' and 'Numeric key' to be transmitted by the remote control device 101. In this case, it is possible to cope with a batch operation of a plurality of projectors.

Moreover, the ID number for the batch operation is not limited to '0', but a number other than '0' may be used.

Figure 9:
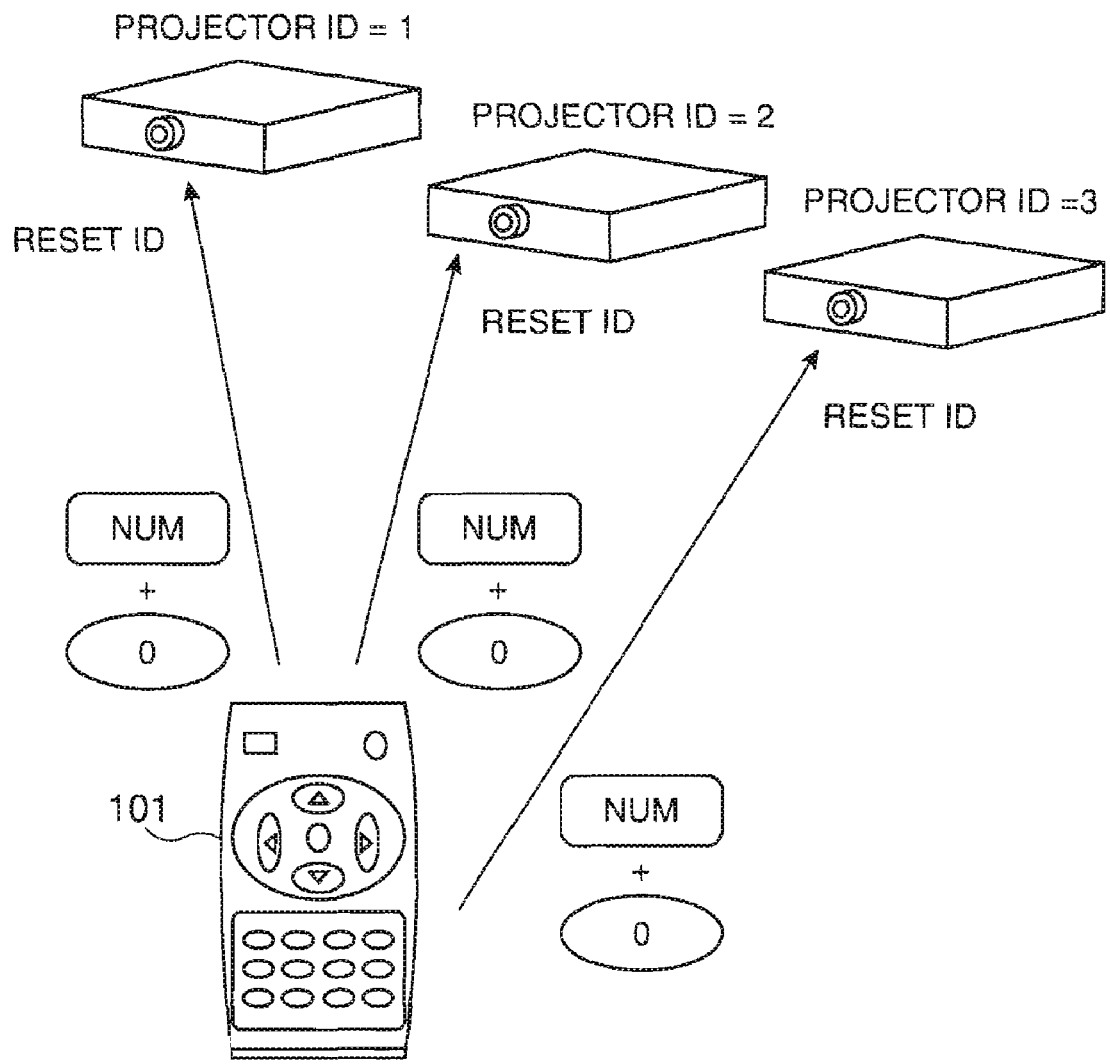
FIG. 9 is a diagram showing an example of an operation when 'NUM key' and '0' are transmitted.

FIG. 9 is a diagram showing an example of an operation when the remote control device 101 transmits 'NUM key' and '0'.

The ID number of the projector main body is generally set on the screen of FIG. 6. Meanwhile, as shown in FIG. 9, when the remote control device 101 transmits 'NUM key' and '0', the ID number of the projector main body may be automatically reset. In this case, the bother of the operation of the user can be reduced.

Moreover, a method of instructing to reset the ID number is not limited to 'NUM key' and '0', but other numeric keys may be used.

Although the description has been given by way of the projector in the first embodiment, the invention is not limited to the projector. For example, the invention can be applied to all electronic apparatuses, such as a television, a DVD player, and the like, which operates by the remote control device.

As described above, according to the projector of the first embodiment, the same effects as the remote control device having an ID transmission function can be obtained through the combination of the special key, such as 'NUM key', and the numeric keys.

Further, if a predetermined ID number is set in the projector main body, it is possible cope with the batch operation of a plurality of projectors.

In addition, it can be configured such that, when the remote control device 101 transmits 'NUM key' and '0', the ID number of the projector main body is automatically reset. Therefore, the bother of the operation of the user can be reduced.

Second Embodiment

In the electronic apparatus according to the first embodiment, when the ID number set in the apparatus main body is inconsistent with 'NUM key' and 'Numeric key' to be transmitted by the remote control device, the apparatus do not respond to the operation of the remote control device.

In an electronic apparatus according to a second embodiment of the invention, the ID number of the apparatus main body is enabled for a specific setting menu.

Figure 10:
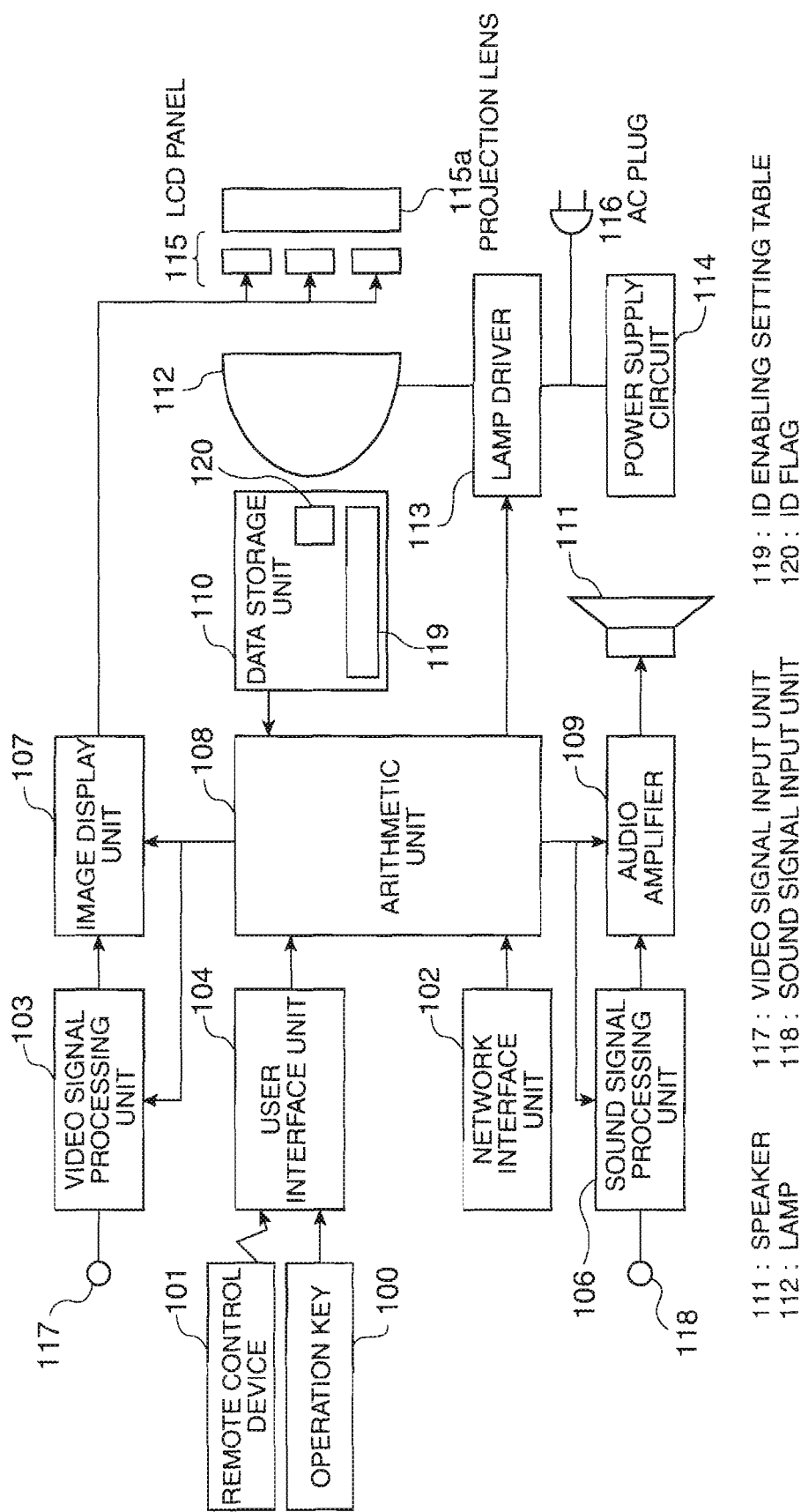
FIG. 10 is a functional block diagram of a projector according to a second embodiment of the invention.

FIG. 10 is a functional block diagram of a projector as an example of the electronic apparatus according to the second embodiment of the invention.

A data storage unit 110 stores an ID enabling setting table 119. An example of the configuration of the ID enabling setting table 119 and data will be described below with reference to FIG. 15. Other parts are the same as those in the first embodiment shown in FIG. 1, and the descriptions thereof will be omitted. Moreover, although an ID flag 120 is provided in the data storage unit 110 of FIG. 10, it will be used for a description of a subsequent fourth embodiment and is not used in the description of the second embodiment.

Figure 11:
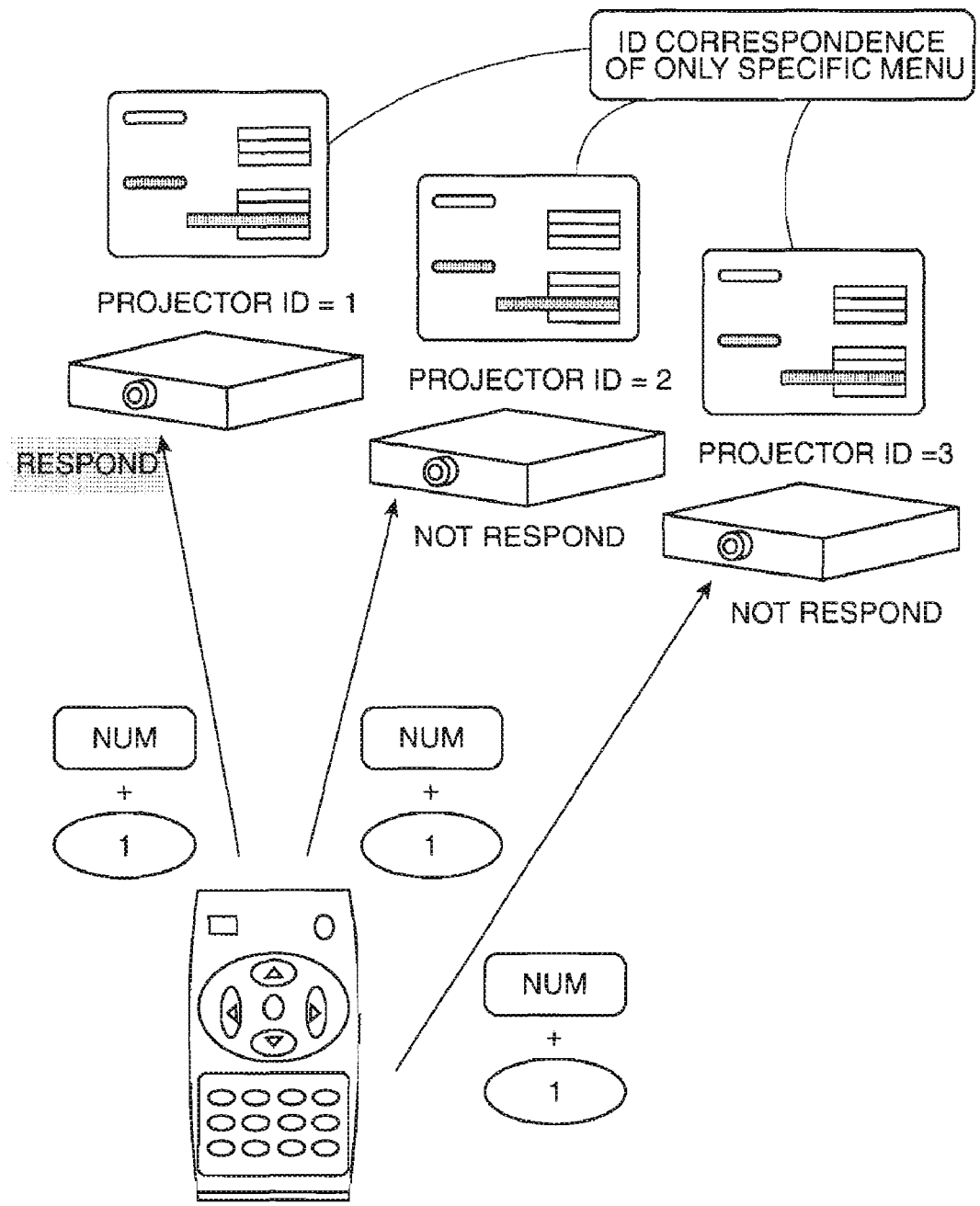
FIG. 11 is a diagram illustrating an example when a projector responds to an operation of a remote control device.

FIG. 11 is a diagram illustrating an example when the projector according to the second embodiment responds to the operation of the remote control device.

As shown in FIG. 11, in a case where the operation of the remote control device is performed on a specific menu, in which setting of the ID number is enabled, the projector according to the second embodiment responds to the operation of the remote control device only when the ID number set in the projector main body and 'NUM key' and 'Numeric key' to be transmitted by the remote control device are consistent with each other.

Moreover, an example of a menu will be described with reference to FIG. 12, and the correspondence between the menu and the ID number will be described with reference to the example of the structure of the ID enabling setting table 119 and data shown in FIG. 15.

Figure 12:
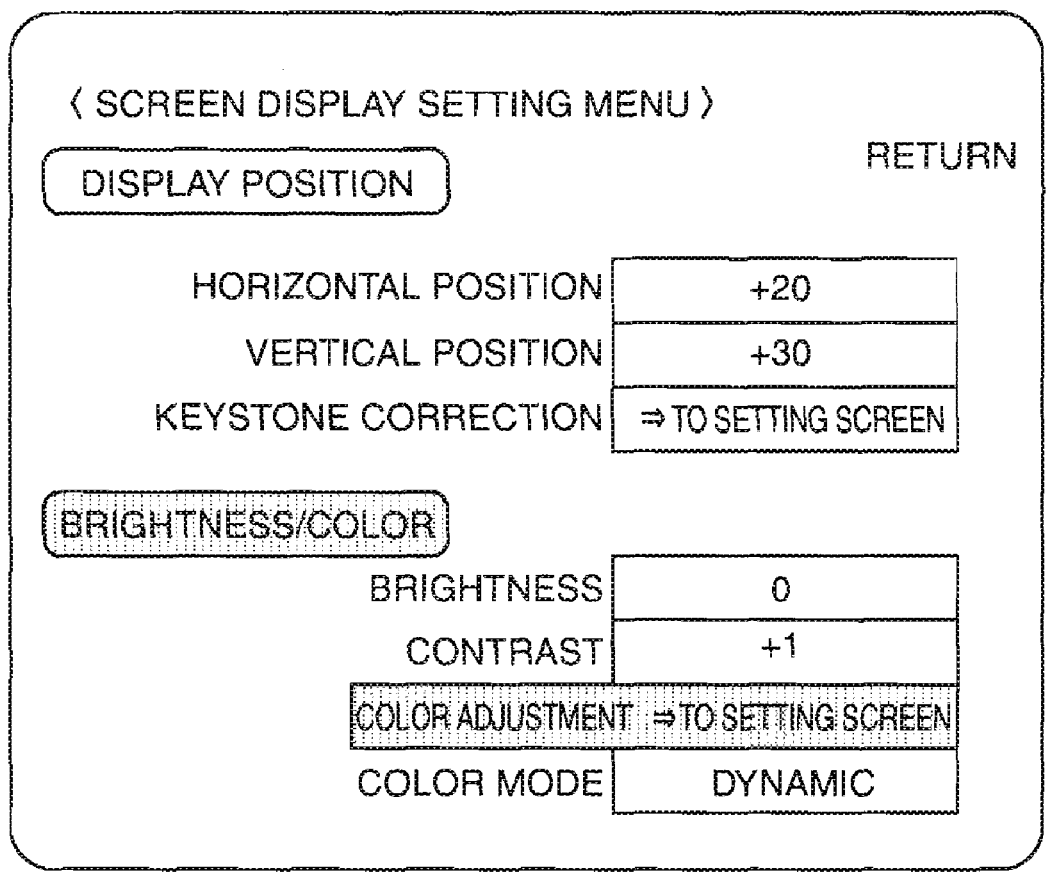
FIG. 12 is a diagram showing an example of a menu of the projector according to the second embodiment of the invention.

FIG. 12 is a diagram showing an example of a menu in the projector according to the second embodiment.

The menu is provided when parameters relative to the operation of the projector main body are set. For example, as shown in FIG. 12, when a screen display position is adjusted ('Display Position' menu of FIG. 12) or when the adjustment of brightness/color is performed ('Brightness/Color' menu of FIG. 12), the user can set the above-described parameters on a setting screen shown in FIG. 12.

If it is configured such that setting of the ID number is enabled for each menu, a setting parameter common to the apparatuses can be commonly set through a batch operation by the remote control device, and an ID number can be assigned to only a specific setting parameter to be separately set and can be set for each apparatus. Therefore, convenience of the user is improved under an environment where parameters of a plurality of apparatuses need to be set.

Figure 13:
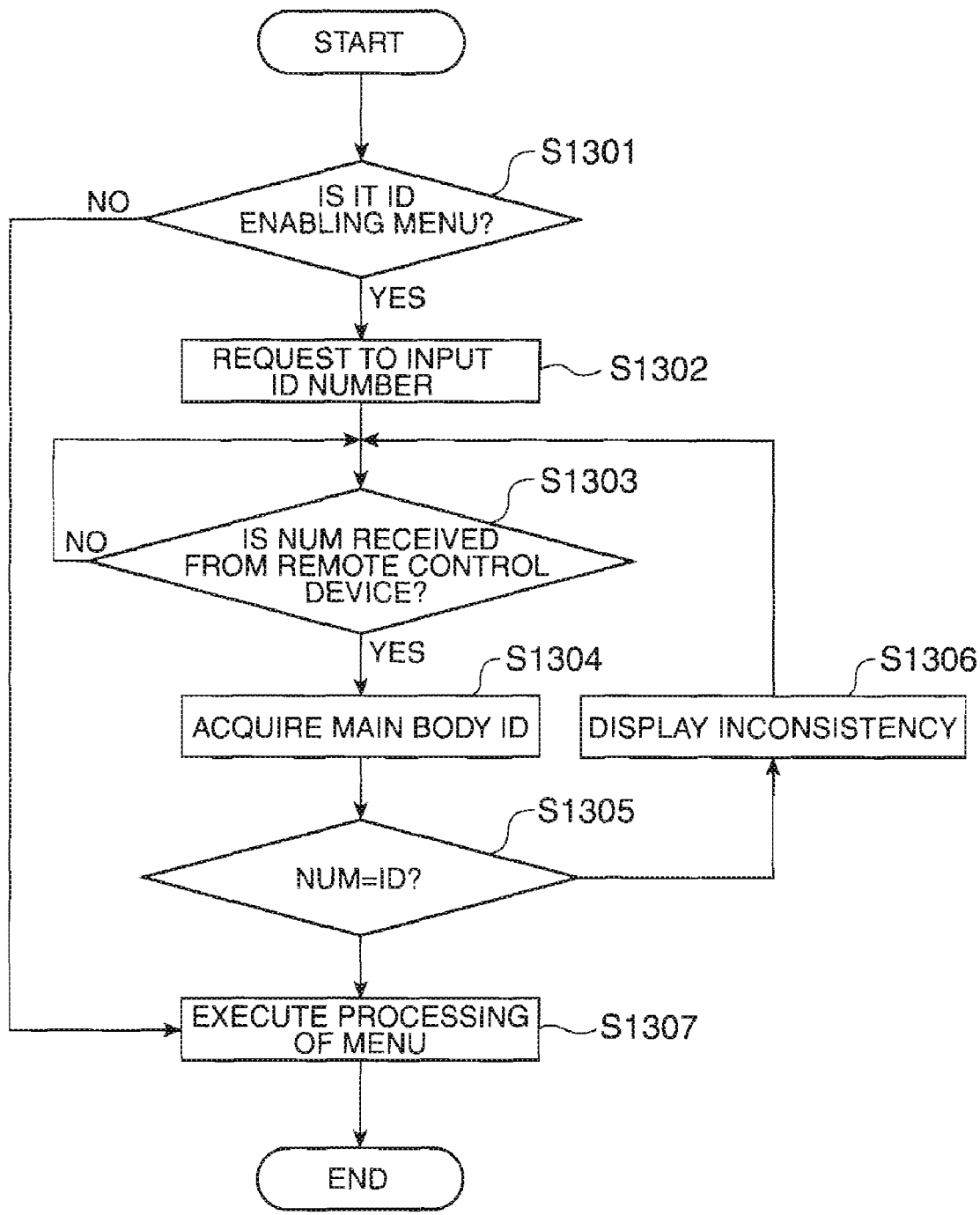
FIG. 13 is a diagram showing an operation when an operation information signal relative to the menu is transmitted.

FIG. 13 is a diagram illustrating an operation when the remote control device 101 transmits an operation information signal relative to the menu in the projector of FIG. 10.

(Step S1301) If the remote control device 101 transmits the operation information signal, the user interface unit 104 receives the operation information signal and sends the operation information signal to the arithmetic unit 108.

The arithmetic unit 108 refers to the ID enabling setting table 119 (see FIG. 15 for the details) judges whether or not the corresponding menu is a menu enabling the ID number. If it is an ID enabling menu, the process progresses to Step S1302. If it is an ID disabling menu, the process progresses to Step S1307.

(Step S1302) The arithmetic unit 108 requests to input the ID number or sends the purport to the image display unit 107 so as to instruct the image display unit 107 to output a screen and demands the user to input the ID number, if necessary. (Step S1303) The arithmetic unit 108 waits until the ID number is input from the remote control device 101. Here, it is assumed that the input of 'NUM key' and 'Numeric key' is regarded as the input of the ID number. (Step S1304) The arithmetic unit 108 acquires the ID number of the projector main body from the data storage unit 110. It is assumed that the ID number of the projector main body is prescribed. (Step S1305) The arithmetic unit 108 compares the ID number ('NUM key' and 'Numeric key') transmitted by the remote control device 101 and the ID number of the projector main body. If both are the same, the process progresses to Step S1307. If both are not the same, the process progresses to Step S1306.

(Step S1306) If necessary, the arithmetic unit 108 sends, to the image display unit 107, a purport that the ID number ('NUM key' and 'Numeric key') transmitted by the remote control device 101 and the ID number of the projector main body are inconsistent with each other, and instructs the image display unit 107 to output a screen.

(Step S1307) The arithmetic unit 108 executes a processing corresponding to the operation information signal transmitted by the remote control device 101.

Figures 14, 15:
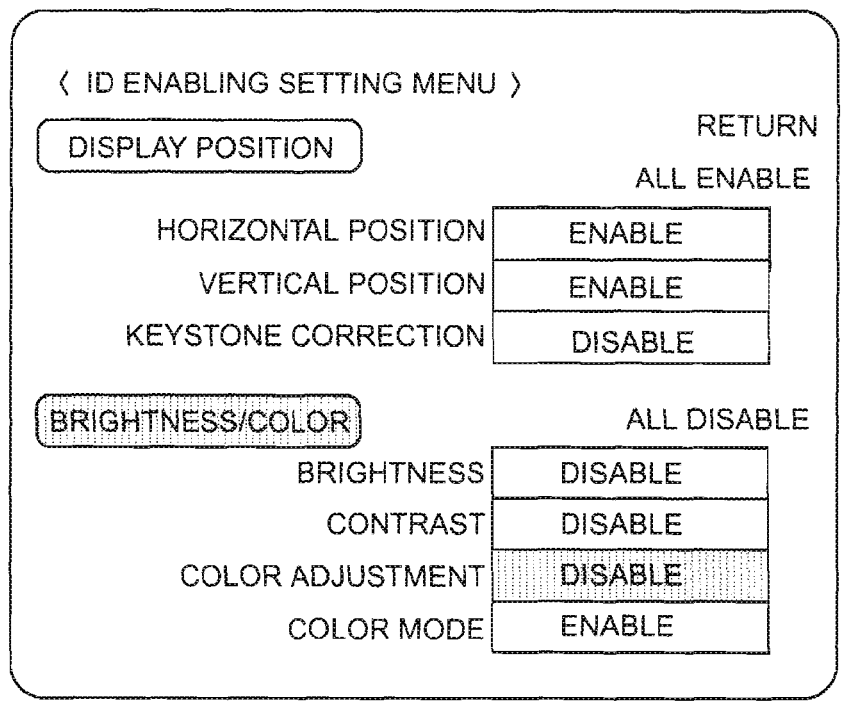
FIG. 14 is a diagram showing an example of a screen for setting whether or not an ID number is enabled.
FIG. 15 is a diagram illustrating examples of the configuration of an ID enabling setting table 119 and data.

FIG. 14 is a diagram showing an example of, for the menu shown in FIG. 12, a screen for setting whether or not the ID number is enabled.

The user can operate the operation key 100 or the remote control device 101 so as to set whether or not the ID number is enabled for each menu on the setting screen shown In FIG. 14. The setting result is set in the ID enabling setting table 119 stored in the data storage unit 110 by the arithmetic unit 118 (see FIG. 15 for the details of the ID enabling setting table 119).

In FIG. 14, when a function of the 'enabled' menu is executed, the input of the ID number is requested (see Step S1301 of FIG. 13).

FIG. 15 is a diagram illustrating examples of the configuration of the ID enabling setting table 119 and data. Hereinafter, the respective examples will be described.

'Menu Number' represents an identification number internally allocated to the menu.

'New Menu Number' represents a menu number for specifying a high-order menu when a hierarchy is provided in the menu. In the data example of FIG. 15, a 'Horizontal Position' menu of the menu number '2' represents a menu that is located below a 'Display Position' menu of the menu number '1'.

'Menu Name' is a string of display characters when the menu is displayed on the screen.

'Enable/Disable' represents, for the corresponding menu item, whether or not the ID number of the projector main body is enabled.

Moreover, in the data example of FIG. 15, a data example corresponding to screen display shown in FIG. 14 is shown.

Figure 16:
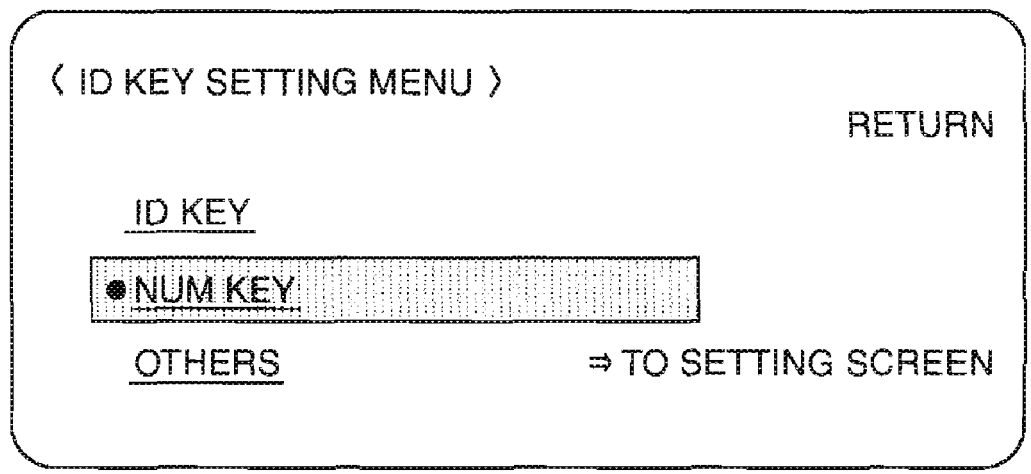
FIG. 16 is a diagram showing an example of a screen for setting an alternative key for an ID key.

FIG. 16 is a diagram showing an example of a screen for allowing the user to set an alternative key for an ID key of the remote control device 101

The remote control device not having an ID transmission function has a special key, such as 'NUM key', and this key can be used instead of the ID key. However, the kind of the special key is not limited to 'NUM key'. If the user himself/herself can set an alternative key for the ID key on the screen shown in FIG. 16, choices of the remote control device 101 are increased, and it is advantageous for the user.

Figure 17:
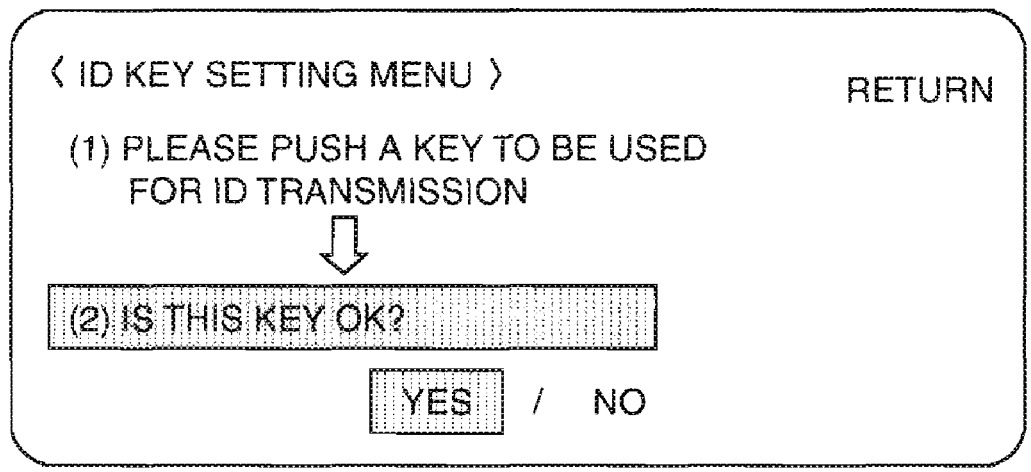
FIG. 17 is a diagram showing an example of a screen when an 'Others' menu is selected.

FIG. 17 is a diagram showing an example of a screen when the 'Others' menu of FIG. 16 is selected.

In FIG. 16, when a key that the user desires does not exist in the choices, the screen shown in FIG. 17 is provided, and a signal corresponding to the key that the user desires is stored in the projector main body. Then, an arbitrary key can be used as an alternative for the ID key.

Figure 18:
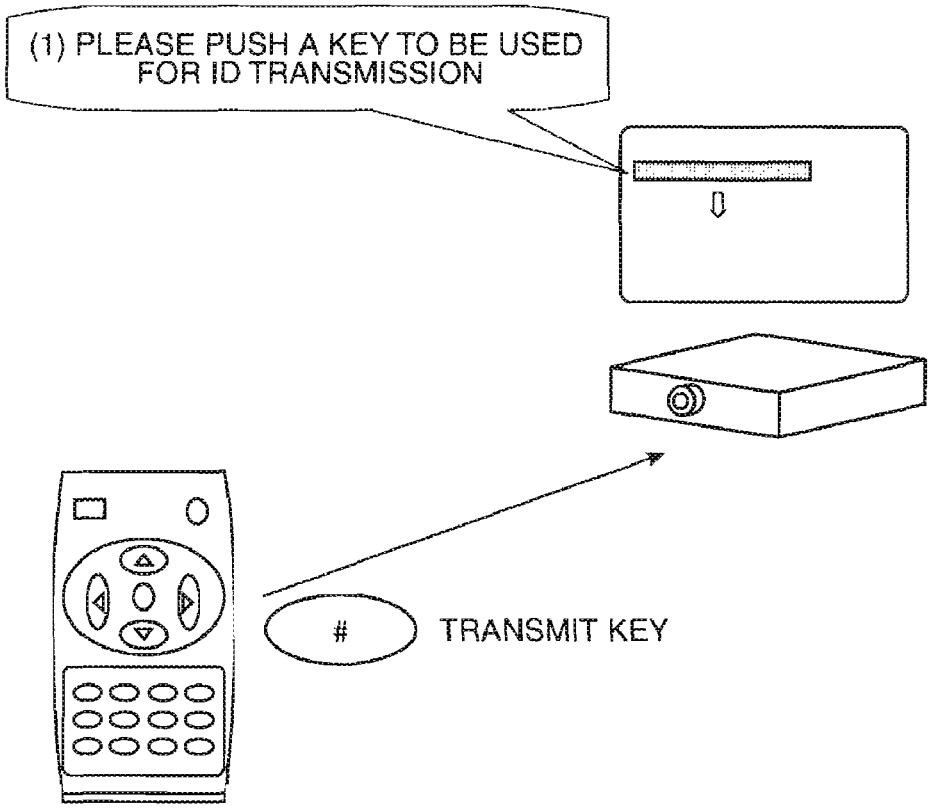
FIG. 18 is a diagram showing a scene when the screen of FIG. 17 is used.

FIG. 18 is a diagram showing a scene when the screen of FIG. 17 is used.

For example, when the user wants to use a '#' key as the alternative key for the ID key, as shown in FIG. 18, the user can depresses the '#' key on the setting screen, and store a signal corresponding to the key in the projector.

Figure 19:
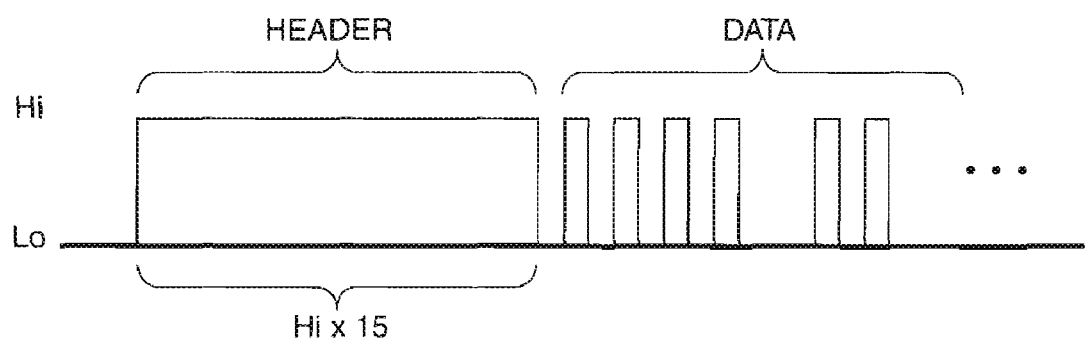
FIG. 19 is a diagram showing an example of a signal to be transmitted by the remote control device 101.

FIG. 19 is a diagram showing an example of a signal to be transmitted by the remote control device 101.

When the user depresses a predetermined key of the remote control device 101, a predetermined Hi-Lo signal pattern corresponding to the predetermined key is transmitted to the projector main body. In FIG. 17 or 18, the projector main body may identify and store the signal pattern as the alternative key for the ID key.

When the projector identifies the signal pattern shown in FIG. 19, a rising edge of the signal may be detected at a timing according to a frequency of a signal to be transmitted by the remote control device 101, and the Hi-Lo patterns of the signal may be counted.

For example, in the example of FIG. 19, if 15 Hi signals are continued, that portion can be identified as a header signal. Further, subsequent signals can be identified as a data signal corresponding to the key of the remote control device. The projector can identify and store the data signal and can recognize the alternative key for the ID key.

As described above, according to the projector of the second embodiment, since the ID number can be enabled for each menu, a menu item to be commonly set can be collectively set by the remote control device, and a menu item to be separately set can be separated set by enabling the ID number.

Further, since the alternative key for the ID key can be arbitrarily set, a range of choices of the remote control device is widened.

Third Embodiment

In the projector according to the first or second embodiment, the remote control device riot having an ID transmission function can exhibit the same effects as the remote control device having an ID transmission function.

A projector according to a third embodiment is configured such that the correspondence between an existing projector and an ID number can be established through a software update. Moreover, the configuration is the same as that in the second embodiment shown in FIG. 10, and the description thereof will be omitted.

Figure 20:
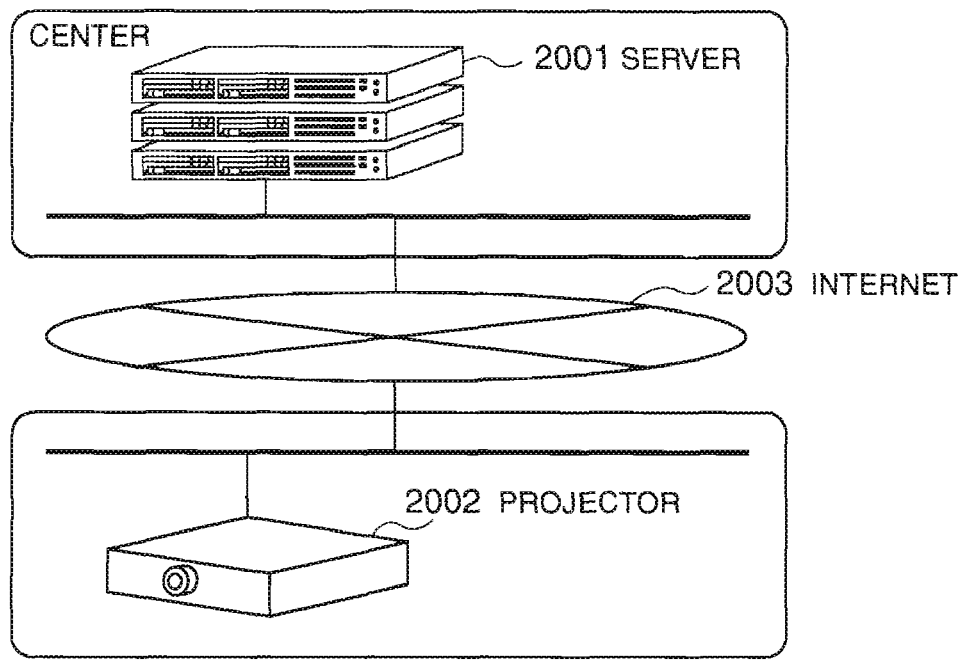
FIG. 20 is a diagram showing an example of the use of a projector according to a third embodiment of the invention.

FIG. 20 is a diagram showing an example of the use of the projector according to the third embodiment.

In general, software, which is called firmware for defining the operation of the electronic apparatus, is installed in a storage unit or the like that is incorporated into an apparatus main body. Upon version-up of such firmware, firmware may be automatically downloaded and the version-up may be performed through a request to a manufacturer or, if an apparatus can be connected to Internet, a predetermined procedure by the user.

If the operation of the projector according to the first or second embodiment is mounted as firmware, and the function is implemented by the version-up of firmware, an existing non-ID-compliant projector can be upgraded to a projector having the same effects as an ID-compliant projector.

For example, as shown in FIG. 20, an updated version of firmware may be stored in a server 2001, and a projector 2002 may access the server 2001 through Internet 2003 and download and update updated firmware from the server 2001. In this case, the user does not need to perform a special operation, and the non-ID-compliant projector can be upgraded to a projector having the same effects as the ID-compliant projector.

Figure 21:
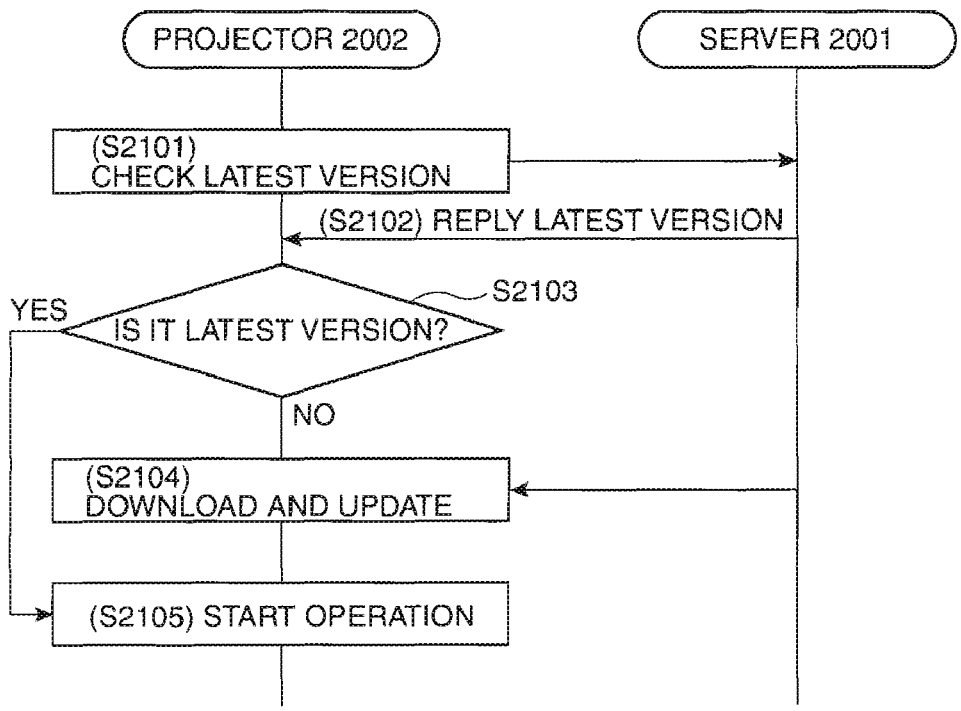
FIG. 21 is a diagram illustrating a procedure of performing a version-up of firmware.

FIG. 21 is a diagram illustrating an example of a version-up procedure of firmware to be executed by the projector 2002.

(Step S2101) The projector 2002 automatically accesses the server 2001 upon the start and checks the latest version number of firmware.

(Step S2102) The server 2001 replies the latest version number of firmware to the projector 2002.

(Step S2103) The projector 2002 compares the firmware version of the apparatus itself and the latest firmware version acquired at Step S2102. If firmware of the apparatus itself is the latest, the process progresses to Step S2105. If firmware of the apparatus itself is not the latest, the process progresses to Step S2104.

(Step S2104) The projector 2002 downloads a latest firmware image from the server 2001 and performs an update processing.

(Step S2105) The projector 2002 starts a normal operation.

As described above, according to the projector of the third embodiment, the existing non-ID-compliant projector can be upgraded to a projector having the same effects as the ID-compliant projector only by updating firmware, without needing a special operation by the user.

Fourth Embodiment

A fourth embodiment of the invention has the same configuration as the functional block diagram shown in FIG. 10. In particular, an ID flag (IDF) 120 is provided in the data storage unit 110. For example, when the ID flag 120 is in a reset state (IDF=0), an operation signal from the remote control device 101 is received. Moreover, it is assumed that, at an initial stage upon power activation, the ID flag 120 is reset by the arithmetic unit 108, for example.

Figure 22:
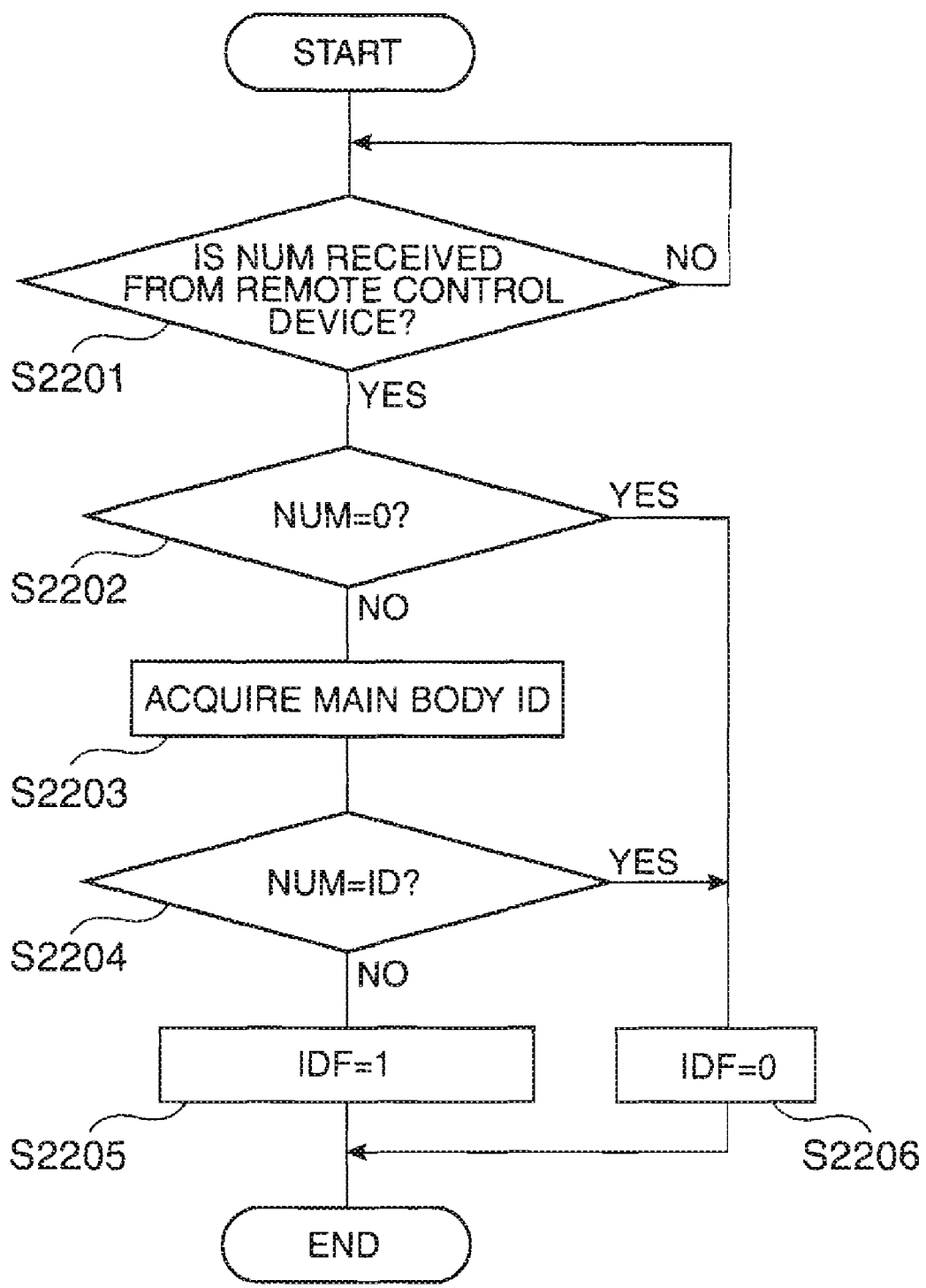
FIG. 22 is a flowchart showing an input processing of the ID number from the remote control device.

FIG. 22 is a flowchart showing an input processing of the ID number from the remote control device. With this processing, the ID flag 120 is set or reset.

(Step S2201) The arithmetic unit 108 waits for the input of the ID number from the remote control device 101. Here, like the above embodiments, the input of 'NUM key' and 'Numeric key' is regarded as the input of the ID number.

(Step S2202) If the ID number is input, the arithmetic unit 108 judges whether or not the ID number ('NUM key' and 'Numeric key') is '0'. When the ID number is not '0', the process progresses to Step S2203. When the ID number is '0', the process progresses to Step S2206.

(Step S2203) If it is judged that the ID number is not '0', the arithmetic unit 108 acquires the ID number of the projector main body from the data storage unit 110. It is assumed that the ID number of the projector main body is prescribed, like the above embodiments.

(Step S2204) The arithmetic unit 108 compares the ID number transmitted by the remote control device 101 and the ID number of the projector main body. If both are not the same, the process progresses to Step S2205. If both are the same, the process progresses to step S2206.

(Step S2205) If it is judged that the ID number from the remote control device 101 and the ID number of the projector main body are inconsistent with each other, the arithmetic unit 108 sets the ID flag (IDF) 120 (IDF=1) (corresponding to a second processing of the invention).

(Step S2206) When the ID number from the remote control device 101 is '0' and when the ID number from the remote control device 101 and the ID number of the projector main body are consistent with each other, the arithmetic unit 108 resets the ID flag (IDF) 120 (IDF=0) (corresponding to a first processing of the invention).

Figure 23:
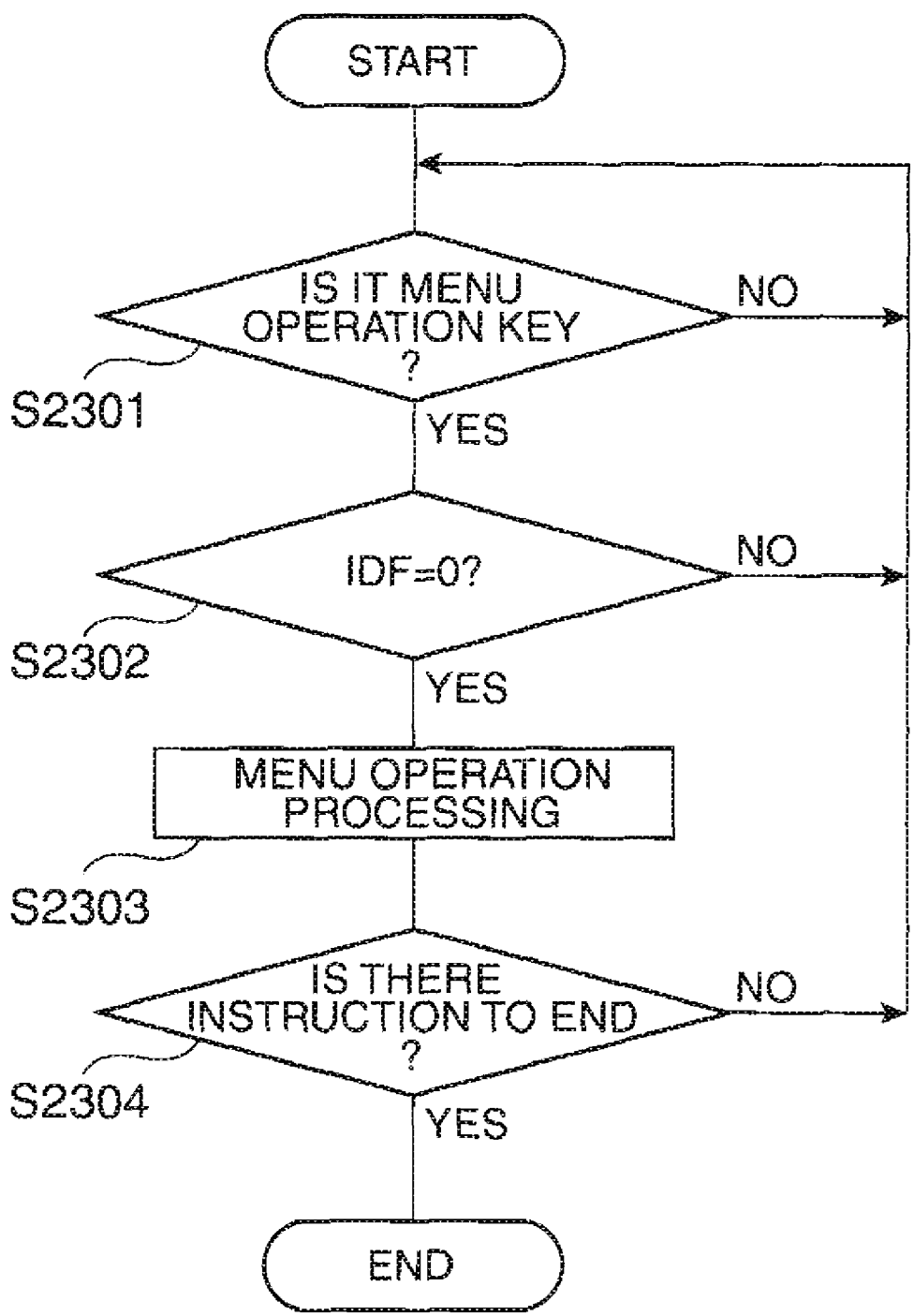
FIG. 23 is a flowchart showing a processing by a menu operation key.

FIG. 23 is a flowchart showing a processing when an operation signal is received from the remote control device 101, for example, a menu operation key operates.

(Step S2301) If the operation signal is input, the arithmetic unit 108 judges whether or not the operation signal is an operation signal of the menu operation key. When it is judged that it is the operation signal of the menu operation key, the process progresses to Step S2302. When it is not the operation signal of the menu operation key, it waits until the operation signal is input.

(Step S2302) The arithmetic unit 108 reads data of the ID flag (IDF) 120 and judges whether or not the ID flag (IDF) 120 is reset (IDF=0). When it is judged that the ID flag (IDF) 120 is reset, the process progresses to Step S2303. When it is judged that the ID flag (IDF) 120 is not reset (set), the process returns to Step S2301. Moreover, as described above, at the initial stage of the power activation, when the ID number from the remote control device 101 is '0' and when the ID number from the remote control device 101 and the ID number of the projector main body are consistent with each other, the ID flag (IDF) 120 is reset.

(Step S2303) When the ID flag (IDF) 120 is reset, the arithmetic unit 108 performs a processing corresponding to the operation signal of the menu operation key.

(Step S2304) The arithmetic unit 108 repeatedly performs the above processing insofar as an instruction to end the processing is not received. If the instruction to end the processing is received, the arithmetic unit 108 ends the processing.

As described above, in the fourth embodiment, the operation signal from the remote control device 101 is received according to the state of the ID flag (IDF) 120. Accordingly, while the remote control device operates and the ID number (excluding the ID number '0') is transmitted, or when the ID number '0' is transmitted from the remote control device 101, a plurality of adjacent projectors can be collectively controlled. Then, when an ID number of a specific main body is transmitted, only the corresponding projector can be controlled from that time. For this reason, operationality by the remote control device can be markedly improved.

Although an operation example of a menu key is described in the fourth embodiment (FIG. 23), other key operations can be similarly processed.

The fourth embodiment can be similarly applied to the second embodiment. In the flowchart of FIG. 13, the arithmetic unit 108 refers to the ID enabling setting table 119 and judges whether or not the menu is a menu enabling the ID number (Step S1301). Then, if the menu is an ID enabling menu, the check processing (Steps S1302 to S1305) of the ID number is performed. Alternatively, like the above example, it may be judged whether or not the ID flag (IDF) 120 is reset, and, if it is judged that the ID flag (IDF) 120 is reset, the processing of the menu may be executed (Step S1307). Therefore, a processing corresponding to each menu can be performed.

In the above example, as the first processing of the invention, at the initial stage, when the ID number '0' and the ID number of the main body are received, the ID flag (IDF) 120 is reset (IDF=0), and the operation signal is received only in that state. Alternatively, the ID flag (IDF) may be set (IDF=1) and the operation signal may be received only in that state. In this case, in the second processing, the ID flag (IDF) 120 is reset (IDF=0).

What is claimed is:

1. An electronic apparatus comprising:
    a remote control device that transmits a predetermined key code signal, excluding a unique key code signal for identifying the device itself, and an operation information signal of a user;
    a receiving unit that receives the signals transmitted by the remote control device;
    an arithmetic unit; and
    an ID number setting unit that sets an ID number peculiar to a main body of the electronic apparatus,
    wherein the arithmetic unit receives the operation information signal when information specified by a set of the predetermined key code signal received by the receiving unit and numerals from the remote control device is consistent with information specified by the ID number set by the ID number setting unit, and
    even when the information specified by the set of the predetermined key code signal received by the receiving unit and the numerals from the remote control device is not consistent with the information specified by the ID number set by the ID number setting unit, when a predetermined ID number is specified in the main body of the electronic apparatus, the arithmetic unit receives the operation information signal.

2. The electronic apparatus according to claim 1,
    wherein, in a case where the ID number is set by the ID number setting unit, when the receiving unit receives the set of the predetermined key code signal and a predetermined numeral from the remote control device, the arithmetic unit releases setting of the ID number set by the ID number setting unit.

3. The electronic apparatus according to claim 1, further comprising:
    an ID enabling menu setting unit that, in a predetermined menu item, sets whether or not the ID number set by the ID number setting unit is enabled,
    wherein, even when the information specified by the set of the predetermined key code signal received by the receiving unit and the numerals from the remote control device is not consistent with the information specified by the ID number set by the ID number setting unit, for a menu item set purporting that the ID number is disabled, the arithmetic unit executes a function of the corresponding menu item.

4. The electronic apparatus according to claim 1, further comprising:
an ID key setting unit that sets information for specifying the predetermined key code signal,
wherein the arithmetic unit regards a signal specified by the ID key setting unit as the predetermined key code signal.

5. The electronic apparatus according to claim 1,
wherein an ID flag is provided, and
the arithmetic unit performs a first processing of resetting or setting the ID flag when the information specified by the set of the predetermined key code signal received by the receiving unit and the numerals from the remote control device is consistent with information specified by the ID number set by the ID number setting unit or the predetermined ID number, performs, on the ID flag, a second processing opposite to the first processing in other cases, and receives the operation information signal if the ID flag is subjected to the first processing.

6. The electronic apparatus according to claim 5,
wherein the arithmetic unit performs the first processing on the ID flag at a beginning of power activation.

7. A projector comprising the electronic apparatus according to claim 1.

\* \* \* \* \*